United States Patent
Shin et al.

(10) Patent No.: US 11,406,216 B2
(45) Date of Patent: Aug. 9, 2022

(54) MULTI-FUNCTIONAL FOOD COOKER HAVING WATER PURIFICATION FUNCTION

(71) Applicant: BUMIL INDUSTRIAL CO., LTD., Incheon (KR)

(72) Inventors: Young Suk Shin, Incheon (KR); Jong Min Jeon, Incheon (KR)

(73) Assignee: BUMIL INDUSTRIAL CO., LTD., Incheon (KR)

( * ) Notice: Subject to any disclaimer, the term of this patent is extended or adjusted under 35 U.S.C. 154(b) by 253 days.

(21) Appl. No.: 16/643,292

(22) PCT Filed: Sep. 20, 2017

(86) PCT No.: PCT/KR2017/010342
§ 371 (c)(1),
(2) Date: Feb. 28, 2020

(87) PCT Pub. No.: WO2019/059429
PCT Pub. Date: Mar. 28, 2019

(65) Prior Publication Data
US 2020/0205599 A1  Jul. 2, 2020

(51) Int. Cl.
*A47J 27/62* (2006.01)
*A47J 27/00* (2006.01)
(Continued)

(52) U.S. Cl.
CPC ............ *A47J 27/14* (2013.01); *A47J 27/004* (2013.01); *A47J 36/32* (2013.01); *B01D 35/04* (2013.01);
(Continued)

(58) Field of Classification Search
CPC ...... A47J 27/004; A47J 27/0817; A47J 27/12; A47J 27/14; A47J 27/18; A47J 27/62; A47J 36/32; A47J 31/401; A47J 31/60; B01D 35/04; B01D 2201/4084; H05B 6/108; H05B 6/12; H05B 6/36; H05B 1/0269; B67D 1/08
(Continued)

(56) References Cited

FOREIGN PATENT DOCUMENTS

| KR | 10-0318063 B1 | 12/2001 |
|----|---------------|---------|
| KR | 10-0325418 B1 | 2/2002 |

(Continued)

*Primary Examiner* — Hung D Nguyen
(74) *Attorney, Agent, or Firm* — Jae Youn Kim; Novick, Kim & Lee, PLLC (57) ABSTRACT

A food cooker comprises: a water supplying part for supplying, as hot water or purified water, water supplied from the tap or a spring water container, according to the selection of a user, so as to supply the water such that food can be cooked; a cooking part enabling food to be cooked using the water supplied to a container, and provided in the downward direction of the water supplying part such that the user can be prevented from being burned by residual heat after the food is cooked; and a controller part provided at the water supplying part and the cooking part so as to enable a water supply, heating time and temperature to be controlled such that the food contained in the container is cooked, and thus the present invention can be provided regardless of location and can prevent the user from being burned by residual heat after the food is cooked.

5 Claims, 6 Drawing Sheets

(51) Int. Cl.
    *A47J 27/14*         (2006.01)
    *A47J 36/32*         (2006.01)
    *B01D 35/04*       (2006.01)
    *H05B 1/02*          (2006.01)
    *H05B 6/12*          (2006.01)
    *H05B 6/36*          (2006.01)

(52) U.S. Cl.
    CPC ............ *H05B 1/0269* (2013.01); *H05B 6/12* (2013.01); *H05B 6/36* (2013.01)

(58) Field of Classification Search
    USPC ......... 99/324, 326, 330, 339, 352, 357, 359, 99/366, 368, 370
    See application file for complete search history.

(56) References Cited

FOREIGN PATENT DOCUMENTS

| | | | |
|---|---|---|---|
| KR | 20-0389791 A | * | 7/2005 |
| KR | 20-0389791 Y1 | | 7/2005 |
| KR | 10-0580150 B1 | | 5/2006 |
| KR | 2008-0000250 U | | 3/2008 |
| KR | 10-2011-0077402 A | | 7/2011 |
| KR | 2011-0077402 A | | 7/2011 |
| KR | 2011-0077402 A | * | 7/2011 |
| KR | 10-1316527 B1 | * | 10/2013 |
| KR | 10-1316527 B1 | | 10/2013 |
| KR | 10-1534510 B1 | * | 7/2015 |
| KR | 10-1534510 B1 | | 7/2015 |
| KR | 10-1565928 B1 | | 11/2015 |
| KR | 10-1566856 B1 | | 11/2015 |
| KR | 10-1566856 B1 | * | 11/2015 |
| KR | 10-1845949 B1 | | 5/2018 |

* cited by examiner

MULTI-FUNCTIONAL FOOD COOKER HAVING WATER PURIFICATION FUNCTION

TECHNICAL FIELD

The present invention relates to a multi-functional food cooker having water purification function, and more particularly, to a multi-functional food cooker having water purification function that is capable of supplying purified water or hot water to food according to cooking methods for the food, heating a cooking container in which the food is put, and cooking the food in the cooking container.

BACKGROUND ART

So as to cook food, generally, the food and water are put into a cooking container, and then, the cooking container is heated to cook the food put therein. However, there is no separate food cooker at convenience stores, large-scale discount stores, supermarkets and so on. In most cases, accordingly, instant food products to which water is poured are cooked, and food products are heated up and cooked through a microwave oven.

Since no separate food cooker is prepared at convenience stores, large-scale discount stores, supermarkets and so on, that is, no food except the instant food products can be cooked and sold there.

So as to solve the above-mentioned problems, an automatic ramen (a kind of instant noodles) cooker having a form of a vending machine is disclosed in Korean Patent Nos. 0318063 and 0325418.

The conventional automatic ramen cooker is very convenient in use, but it is complicated in configuration and also very expensive. Moreover, the conventional automatic ramen cooker makes users become passive. That is, the conventional automatic ramen cooker can cook only the ramen selected by the users, which causes many limitations in selecting various kinds of ramen noodles supplied in a wide range.

Further, the automatic ramen cookers, which have been developed up to now, have the limitations in cooking using the addition of various materials. That is, the automatic ramen cookers developed up to now are difficult to cook the ramen by addition of an egg, leek and so on according to the user's preference.

Accordingly, he or she adopts a conventional manner wherein general ramen, not instant ramen like cup ramen, is selected and various materials like an egg, leek and so on are added to the ramen, according to his or her preference. According to the conventional ramen cooking manner, that is, water is poured into a pot, and ramen cooking is carried out through a gas range.

In the conventional ramen cooking manner, however, it is necessary to pour water into the pot, heat the water, and cook ramen in the pot, which makes the cooking very inconvenient, and especially, it is hard that the conventional ramen cooking manner is adopted in a public place such as PC rooms, stores and so on.

So as to solve the above-mentioned problems, an easy cooker for ramen as first prior art is disclosed in Korean Patent No. 0580150 (dated on May 15, 2006), which includes: a preheated water tank for receiving preheated water needed for cooking ramen from a preheater to store the preheated water therein; a heater unit having a cooking heater adapted to seat a cooking container in which ramen and powder are put thereon, a fixing bracket disposed on one side of the cooking heater, a pressing member rotatably disposed with respect to the fixing bracket and having a portion protruding toward the top of the cooking heater, and a switch disposed between the fixing bracket and the pressing ruler in such a manner as to be turned on according to the rotation of the pressing member; water supply means for feeding the stored water in the preheated water tank to the cooking container seated on the cooking heater and having a water supply valve; a ramen water temperature controller for sensing the temperature of the water stored in the preheated water tank and controlling the preheater according to the sensed temperature to allow the temperature of the water stored in the preheated water tank to be maintained at a ramen water preheated temperature; and a cooking heater temperature for sensing the temperature of the cooking heater, controlling the cooking heater according to the sensed temperature to allow the temperature of the cooking heater to be maintained at the ramen water preheated temperature, and if the pressing member is rotated to turn on the switch after the cooking container in which the ramen and powder are put is seated on the cooking heater, raising the temperature of the cooking heater to a ramen cooking temperature to maintain the raised temperature by the time adequate for the ramen cooking.

According to the first prior art, a main water tank is located on the upper portion of the easy cooker for ramen, and accordingly, the center of gravity of the cooker is on the upper portion of the cooker, so that if the cooker is touched by a user while the ramen is being cooked, it may fall forward or backward.

Further, water vapor is generated from the ramen cooked through the heater unit and is raised toward a water supply faucet, so that dust or foreign matters sticking to the water vapor may be attached to the water supply faucet, thereby making it inconvenient to often clean the water supply faucet. Of course, the dust or foreign matters may enter the water supply faucet, thereby causing the ramen cooking to be carried out in an unsanitary state.

So as to solve the above-mentioned problems the first prior art has had, a ramen cooker as second prior art is disclosed in Korean Utility Model Application Laid-open No. 2008-0000250 (dated on Mar. 3, 2008), which includes: a water tank for supplying water; a hot water tank for storing high temperature water and having a heater attached thereto; a nozzle for supplying the high temperature water to a ramen container according to the opening and closing of a solenoid valve; a heating plate for heating the ramen container; a sensor for sensing the existence and non-existence of the ramen container; a sensor for sensing the operation of an auxiliary base; an external structure for attaching steel plates as a front surface and side surfaces to a support as an aluminum profile in such a manner as to be easily exchanged or changed; a display for displaying a ramen cooking state; buttons for selecting ramen cooking processes; and a printed circuit board for controlling the ramen cooking, wherein the auxiliary base has a spring attached thereto to separate the ramen container in which no water is put from the heating plate and operates according to the gravity of water in the ramen container.

According to the second prior art, also, the water vapor generated while the ramen is being boiled is introduced into the nozzle from which water is supplied, and dust and foreign matters are attached to the water vapor introduced into the nozzle, thereby undesirably causing the water supply in an unsanitary state.

Besides, even the surrounding portions around the nozzle may be contaminated with the dust and foreign matters attached to the water vapor or the soup spattering during the ramen cooking, thereby undesirably causing the ramen cooking to be carried out in a more unsanitary state.

So as to solve the above-mentioned problems the second prior art has had, a cooker combined with a cold/hot water dispenser as third prior art is disclosed in Korean Patent Application Laid-open No. 2011-0077402 (dated on Jul. 7, 2011), which includes: filtering means for receiving raw water to purify the raw water; a purified water tank for storing the purified water passing through the filtering means; a cold water tank for receiving the purified water from the purified water tank and cooling the purified water through a cooler to store the cold water therein; a hot water tank for receiving the purified water from the purified water tank and heating the purified water through a heater to store the hot water therein; a purified water unit connected to the cold water tank and the hot water tank, respectively, and having cold and hot water valves for discharging the cold water and hot water; a cooking unit disposed below the front side of the purified water unit and having a cooking plate located on top thereof to heat a cooking container coming into contact therewith and an electric heater as a heating source located at the inside thereof; a ventilation fan located on the front surface of the purified water unit to convey the heat and water vapor generated upon the food cooking in the cooking unit to the outside; and heat insulating members located on the edges of the cooking plate of the cooking unit to block heat transfer and having a shock absorbing function.

According to the third prior art, the electric heater is located in the cooking unit on which the cooking container is placed, and the heating for the cooking container is carried out by the electric heater, so that the transfer of the heating source is blocked by means of the heat insulating members. Since the thicknesses of the heat insulating members are relatively low, however, it is impossible to completely block the transfer of the heating source.

After the cooking, further, the heat generated from the electric heater still remains, and if no cover is placed on the cooking unit, a burn may be caused by the residual heat of the electric heater.

In the state where the cover is not placed on the cooking unit, also, power is continuously applied to the electric heater, thereby undesirably causing the electric heater to be overheated, and so as to prevent the application of power from being kept, accordingly, the cooker should be checked carefully whenever it is used, thereby making a user feel inconvenient in use.

According to the third prior art, moreover, it is hard to install the cooker at a place where a water supply line for supplying water cannot be connected to the cooker.

DISCLOSURE

Technical Problem

Accordingly, the present invention has been made in view of the above-mentioned problems occurring in the prior art, and it is an object of the present invention to provide a multi-functional food cooker having water purification function that is capable of supplying water from a water supply line or water bottle according to surrounding environments thereof to cook food with the supplied water.

It is another object of the present invention to provide a multi-functional food cooker having water purification function that is capable of preventing a user from being burned due to residual heat after food cooking.

It is yet another object of the present invention to provide a multi-functional food cooker having water purification function that is capable of allowing food cooking to be continuously carried out for a given period of time through reheating in the state where the cooking time set therein is exceeded.

Technical Solution

To accomplish the above-mentioned objects, according to the present invention, there is provided a multi-functional food cooker having water purification function including: a water supply unit for feeding the water supplied from a tap or water bottle as hot water or purified water according to a user's selection to allow food to be cooked with the hot water or purified water; a cooking unit adapted to cook the food with the water fed to a cooking container and located on the underside of the water supply unit to prevent the user from being burned due to residual heat after food cooking; and a control unit disposed on the water supply unit and the cooking unit to control water supply and heating time and temperature for cooking the food in the cooking container, wherein the cooking unit includes: a cooking unit body having a shape of a flat plate to locate the food cooker's body on top thereof, having tempered glass or heat resistant glass disposed on one side thereof to place the cooking container thereon, having a given space formed at the inside thereof, and being open on one side thereof; a cooking unit cover detachably disposed on the open portion of the cooking unit body; and a heating part disposed inside the cooking unit body and having a circular support plate disposed under the cooking unit body and having support pieces, fixing pieces, and coupling grooves, and coil fixing holes, coils located on top of the support plate to cook the food in the cooking container through electromagnetic induction heating, fixing plates located on tops of the coils in such a manner as to be coupled to the support plate, and ferrite cores insertedly disposed on the underside of the support plate.

According to the present invention, desirably, the water supply unit includes: a food cooker's body having a given space formed at the inside thereof in such a manner as to be open on one side thereof and having a discharge valve disposed on the front surface thereof to supply water; a body cover detachably mounted on the open portion of the food cooker's body and having a plurality of nipples adapted to couple hoses thereto so as to connect the hoses to the tap or the water bottle; a plurality of filters disposed on one side of the body cover by means of a filter clip to purify the water; a distributor connected to the filters to dividedly supply the water supplied through the filters to the discharge valve to the form of purified water or hot water; a water storage tank located inside the food cooker's body to store the water supplied from the filters through the distributor by a given amount; a hot water tank located under the water storage tank in such a manner as to store the water supplied from the water storage tank by a given amount and having a heater adapted to heat the water stored therein; a first solenoid valve adapted to supply the hot water supplied from the hot water tank to the discharge valve to cook the food; and a second solenoid valve disposed inside the food cooker's body in such a manner as to be located between the discharge valve and the distributor to supply the water from the filters and the distributor to the discharge valve and having a pressure control valve mounted thereon.

According to the present invention, desirably, the filter clip includes: a flat panel fixed to one side of the body cover by means of bolts; and a plurality of 'Ω'-shaped clip members disposed on one side of the flat panel to fix the filters thereto.

According to the present invention, desirably, the water supply unit supplies the water supplied from the pressure of the tap or from the water bottle by means of a pump to the water storage tank through the filters and the distributor, stores the water by the given amount in the water storage tank, heats the water in the hot water tank, and selectively supplies the hot water fed from the hot water tank to the cooking container through the first solenoid valve and the discharge valve and the water purified through the filters and the distributor and reduced in pressure through the second solenoid valve and the pressure control valve to the discharge valve.

According to the present invention, desirably, the food cooker's body includes a ventilation fan adapted to prevent the water vapor generated from the food during cooking from being introduced into the discharge valve, the ventilation fan being electrically connected to a main controller so that blowing occurs toward the front surface of the food cooker's body only when power is applied to the heating part.

According to the present invention, desirably, the control unit includes: the main controller for carrying out the cooking container existence/nonexistence checking, the control of the first solenoid valve or the second solenoid valve adapted to supply purified water or hot water, and the control of the heater so as to cook the food if a button part disposed on the front surface of the food cooker's body is manipulated by the user; the button part disposed on the front surface of the food cooker's body and having a cooking button, an instant cooking button, a general cooking button, a start/stop button, a hot water button, a purified water button, a time adding button, and a display; a sensor disposed on the front surface of the food cooker's body in such a manner as to be electrically connected to the main controller to check whether the cooking container is located on the heating part and thus to allow the button part to be activated or deactivated; and a heating part controller electrically connected to the main controller to control the heating part for food cooking, wherein the main controller is formed of a PCB located inside the food cooker's body and the heating part controller is formed of a PCB located inside the cooking unit body.

Advantageous Effects

According to the present invention, the water for cooking food is supplied from a tap or water bottle according to surrounding environments of the multi-functional food cooker, and the food is cooked with the supplied water, so that the multi-functional food cooker can be disposed, without any limitation in installation places.

According to the present invention, further, food cooking is carried out through the electromagnetic induction heating so as to prevent the user from being burned due to the residual heat after the food cooking, so that a burn caused by the residual heat cannot be applied to him or her.

According to the present invention, furthermore, the food cooking is continuously carried out for a given period of time through reheating in the state where the cooking time set in the multi-functional food cooker is exceeded, so that there is no need to return to the initial step for the food cooking.

According to the present invention, in addition, the buttons for controlling the multi-functional food cooker are locked during the food cooking, so that no change in the functions of the cooking utensil occurs during the food cooking.

According to the present invention, also, even if the buttons for selecting the functions are pressed in the state where the cooking container is not placed on the multi-functional food cooker, they are in a deactivated state, so that sudden supply of hot water can be prevented.

MODE FOR INVENTION

Hereinafter, an explanation on a multi-functional food cooker having water purification function according to the present invention will be in detail given with reference to the attached drawing.

According to the present invention, a multi-functional food cooker having water purification function is configured as shown in FIGS. 1 to 4.

Figure 1:
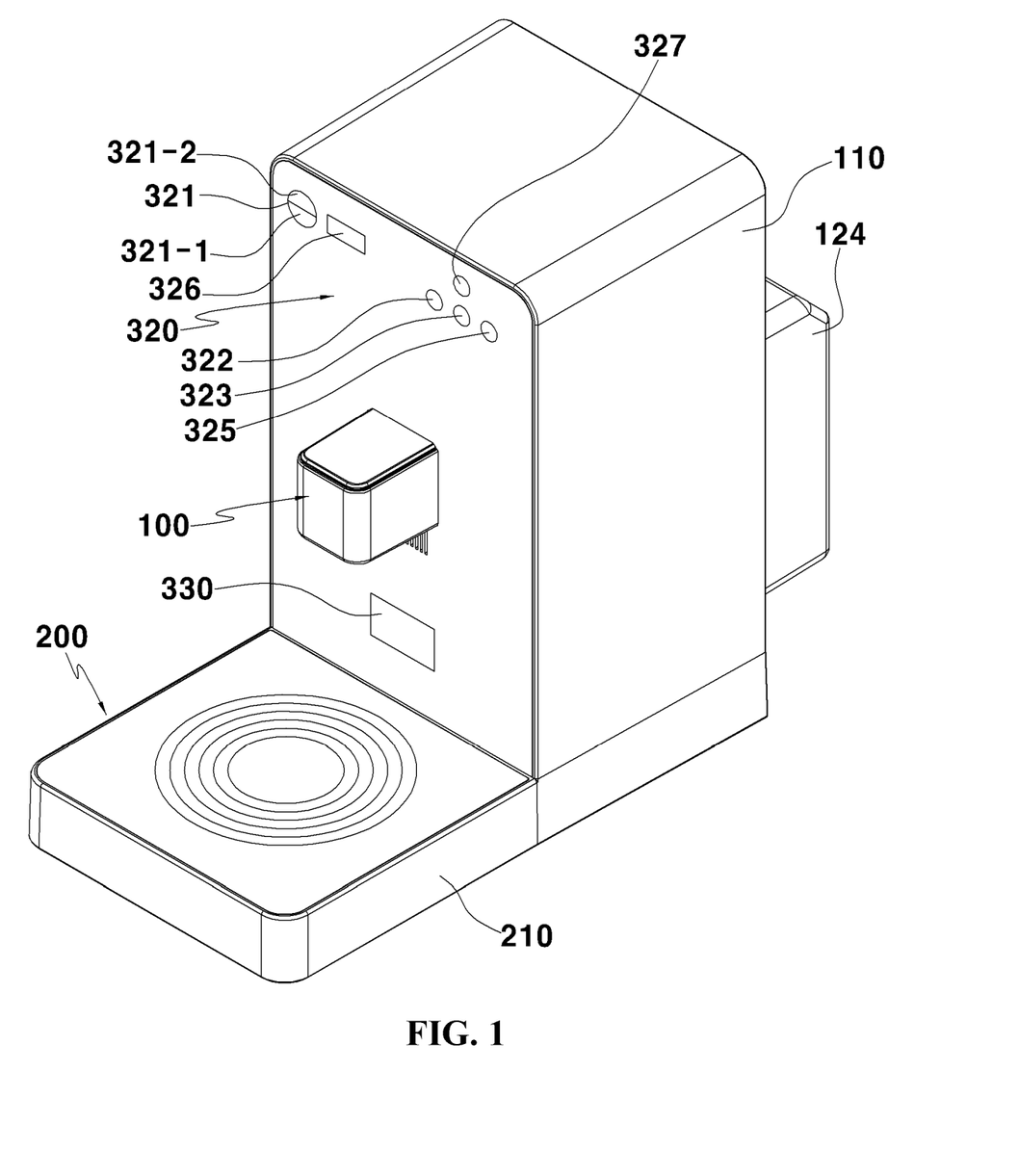
FIG. 1 is a perspective view showing a multi-functional food cooker having water purification function according to the present invention.
Figure 2:
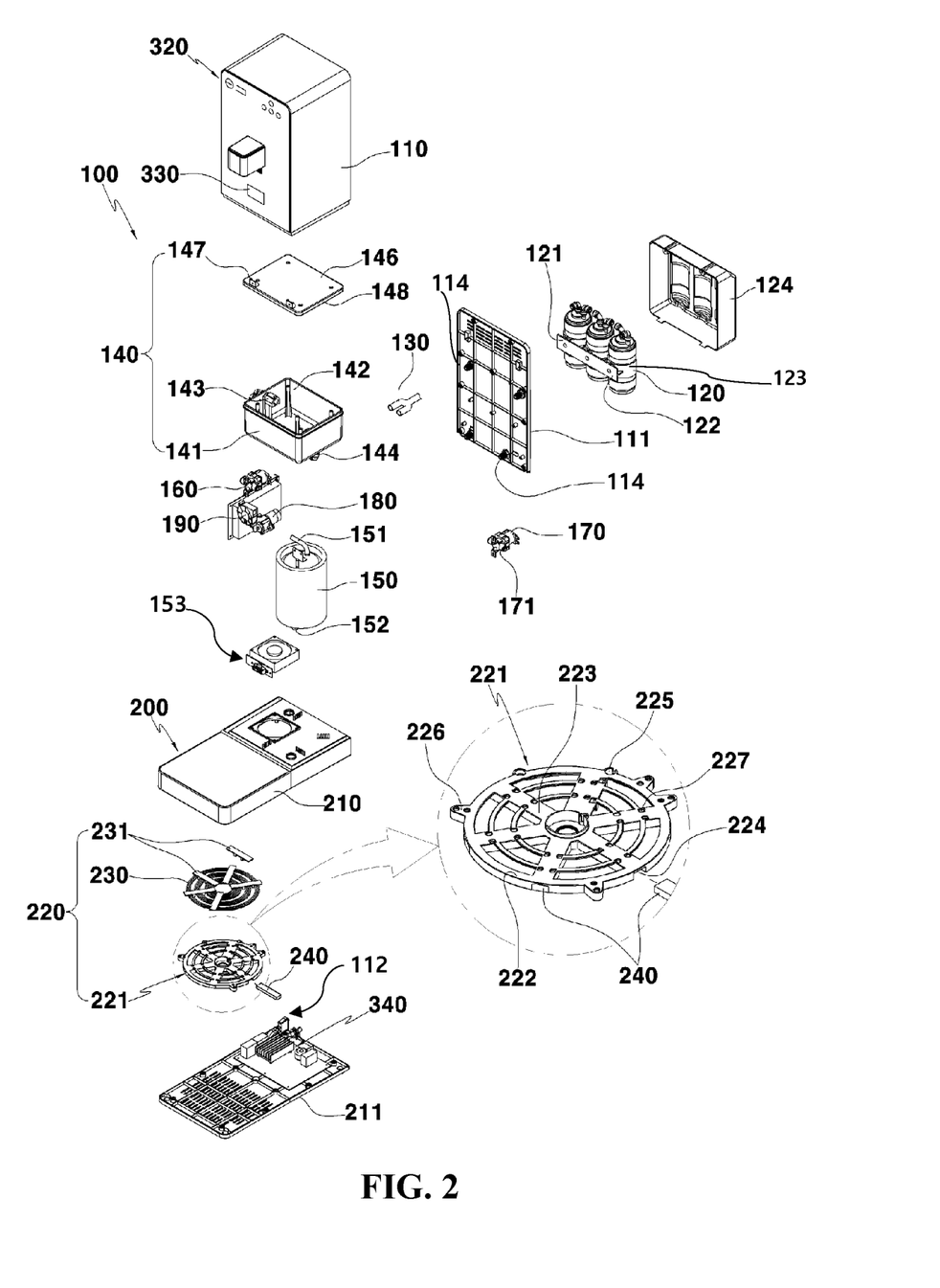
FIG. 2 is an exploded perspective view showing the multi-functional food cooker having water purification function according to the present invention.
Figure 3:
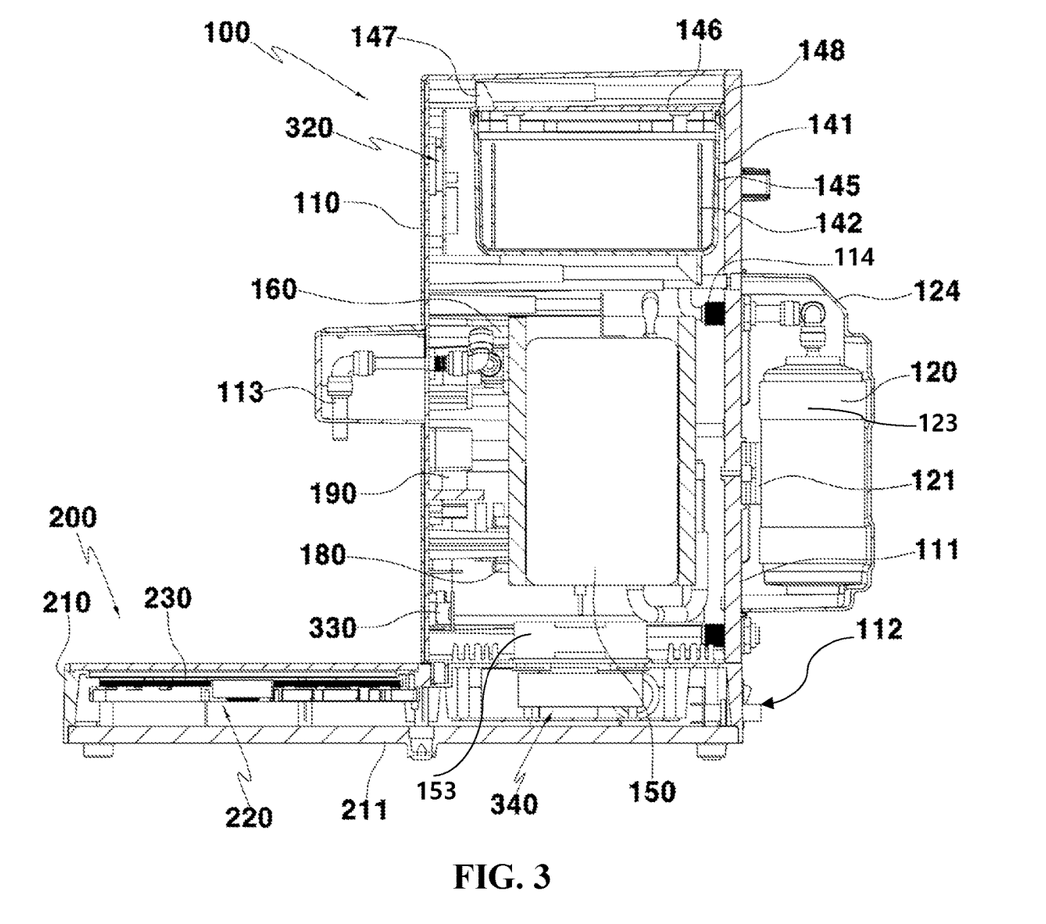
FIG. 3 is a sectional view showing the multi-functional food cooker having water purification function according to the present invention.
Figure 4:
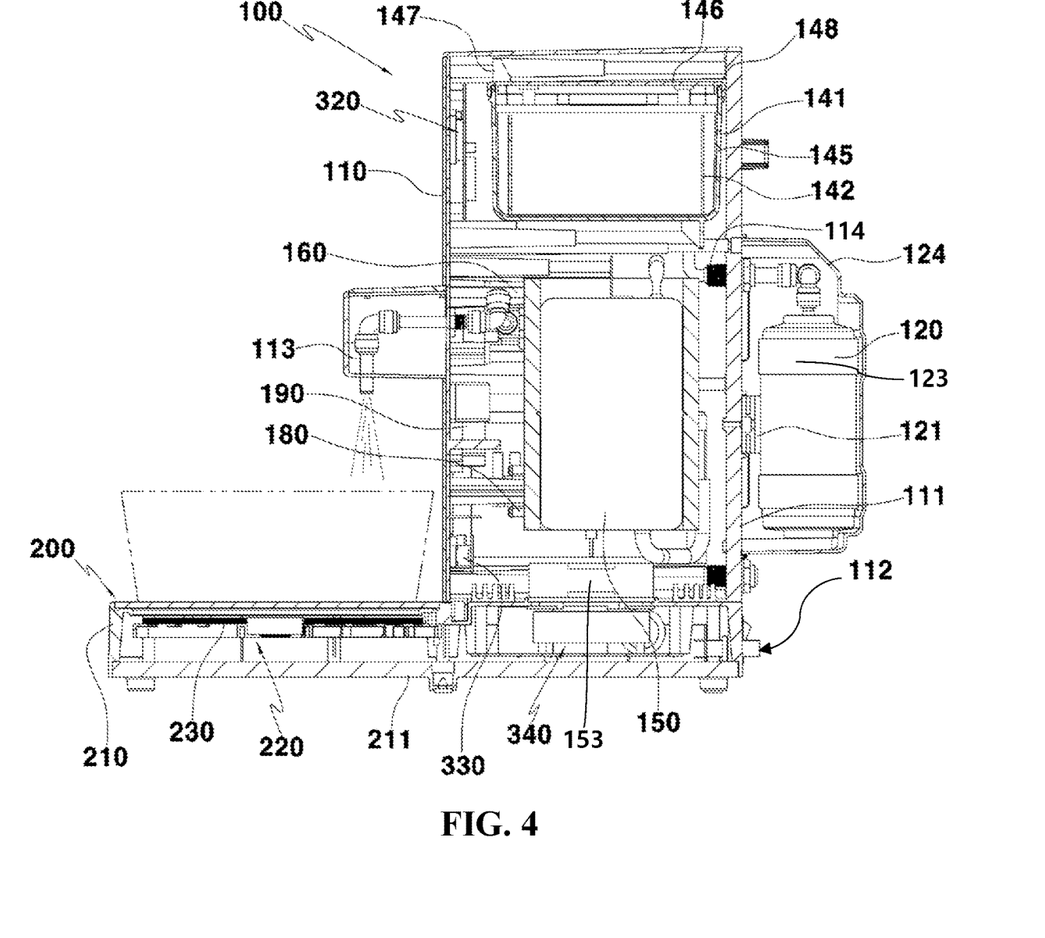
FIG. 4 is a sectional view showing the use state of the multi-functional food cooker having water purification function according to the present invention.

FIG. 1 is a perspective view showing a multi-functional food cooker having water purification function according to the present invention, FIG. 2 is an exploded perspective view showing the multi-functional food cooker having water purification function according to the present invention, FIG. 3 is a sectional view showing the multi-functional food cooker having water purification function according to the present invention, and FIG. 4 is a sectional view showing the use state of the multi-functional food cooker having water purification function according to the present invention.

As shown in FIGS. 1 to 4, a multi-functional food cooker having water purification function according to the present invention includes: a water supply unit 100 for feeding the water supplied from a tap or water bottle as hot water or purified water according to a user's selection to allow food to be cooked with the hot water or purified water; a cooking unit 200 adapted to cook the food with the water fed to a cooking container and located on the underside of the water supply unit 100 to prevent the user from being burned due to residual heat after food cooking; and a control unit 300 disposed on the water supply unit 100 and the cooking unit 200 to control water supply and heating time and temperature for cooking the food in the cooking container.

The water supply unit 100 largely includes a food cooker's body 110, a body cover 111, filters 120, a distributor 130, a water storage tank 140, a hot water tank 150, a first solenoid valve 160, and a second solenoid valve 170.

As shown, the food cooker's body 110 has a generally rectangular parallelepiped that is open on one side thereof and has a given space formed at the inside thereof. Of course, the food cooker's body 110 is not limited in shape thereto, and it may have various shapes. Further, the food cooker's body 110 may be formed integrally with a cooking unit body 210 of the cooking unit 200, thereby having a shape of an approximate 'L'.

The body cover 111 is detachably mounted on the open portion of the food cooker's body 110 and has a plurality of nipples 114 adapted to couple hoses thereto when water is supplied from the filters 120.

Further, the food cooker's body 110 has a discharge valve 113 disposed on the front surface thereof to supply the purified water through the filters 120 or the water heated through the hot water tank 150.

The filters 120 are disposed on one side of the body cover 111 to purify the water supplied from the tap or water bottle. The filters 120 have a filter clip 121 disposed on one side thereof, so that they can be mounted on the body cover 111, and the filter clip 121 has a flat panel 122 adapted to come into close contact with the body cover 111 and a plurality of 'Ω'-shaped clip members 123 formed integrally with one side of the flat panel 122, so that the filters 120 can be detachably mounted on one side of the body cover 111.

Further, the filters 120 have a filter cover 124 disposed on one side thereof to prevent their exposure and escape from the filter clip 121 to the outside and also to prevent dust and foreign matters from being introduced thereinto, so that the filters 120 can be located in a sanitary state.

The filter cover 124 is open on one side thereof, has a given space formed at the inside thereof, and protrudes toward one side thereof like the shape of the filters 120 to allow a portion at which the filters 120 are located to be easily recognized, thereby making it easy to exchange the filters 120 into new ones.

The distributor 130 is adapted to distribute the water supplied through the filters 120 to the discharge valve 113 to the form of hot water or purified water. So as to distribute the water to the water storage tank 140 and the discharge valve 113, one side of the distributor 130 is connected to the water storage tank 140 and the second solenoid valve 170 through a hose (having no reference numeral), and the other side thereof is connected to the filters 120 through a hose. The distributor 130 has a shape of any one of 'Y' and 'T'.

The water storage tank 140 is located inside the food cooker's body 110 to always store the water supplied from the filters 120 through the distributor 130 by a given amount and to supply the stored water to the hot water tank 150. The water storage tank 140 includes a water tank 141 open on one side thereof and having a given space formed at the inside thereof to store water therein, and the water tank 141 has a plurality of fixing protrusions 142 formed therein, a supply nipple 143 for receiving the water from the distributor 130, and a discharge nipple 144 for discharging the water to the hot water tank 150.

The water tank 141 has a water tank cover 146 located on top thereof in such a manner as to have the shape corresponding to the shape of the top side thereof. Further, the water tank cover 146 is coupled to the top side of the water tank 141 to prevent the water stored in the water tank 141 from overflowing.

Even if not shown in the drawing, moreover, a valve is mounted on the water tank 141 to supply water to the hot water tank 150 or to block the water supplied to the hot water tank 150.

The water tank cover 146 has a plurality of fixing protrusions 147 formed on top thereof in such a manner as to be fixed to the inside of the food cooker's body 110 by means of bolts, and accordingly, the water tank 141 is fixed to the food cooker's body 110.

The water tank cover 146 has coupling grooves 148 formed along the underside edges thereof in such a manner as to be coupled to the top edges of the water tank 141, and after silicone packing materials are coupled to the coupling grooves 148, they are fitted to the top edges of the water tank 141, thereby preventing the water stored in the water tank 141 from overflowing.

The hot water tank 150 is located under the water storage tank 140 and has a shape of a cylinder having a given space formed at the inside thereof to store water therein. Further, the hot water tank 150 has a heater 153 adapted to heat the water stored therein. Moreover, the hot water tank 150 has a water inlet 151 and a water outlet 152 formed thereon to introduce and discharge water thereinto and therefrom.

The first solenoid valve 160 is located inside the food cooker's body 110 to supply the hot water supplied from the hot water tank 150 to the discharge valve 113 and thus to discharge the hot water to the outside.

So as to allow the purified water to be supplied when the user cooks food, the second solenoid valve 170 is located inside the food cooker's body 110 in such a manner as to be connected to the filters 120 and the discharge valve 113 through hoses.

Further, the second solenoid valve 170 has a pressure control valve 171 disposed thereon to reduce the pressure of the purified water to a given pressure.

Further, a pump 180 is located inside the food cooker's body 110 to supply the water in the water bottle to the water tank 141 or the discharge valve 113, and the pump 180 is electrically connected to the control unit 300 and is under the control of the control unit 300.

Furthermore, a ventilation fan 190 is located inside the food cooker's body 110 in such a manner as to perform forward blowing to prevent the water vapor generated from the cooked food in the cooking unit 200 from being introduced into the discharge valve 113. Also, the ventilation fan 190 is electrically connected to a main controller 310, so that desirably, blowing occurs only when power is applied to a heating part 220 of the cooking unit 200.

Through the formation of the ventilation fan 190, accordingly, the water vapor generated in the process where the food or ramen put in the cooking container is cooked is not introduced into the portion at which the discharge valve 113 is located, thereby allowing the sanitary cooking state to be maintained.

The cooking unit 200 has a shape of a flat plate to allow the food cooker's body 110 to be located on top thereof and has tempered glass or heat resistant glass disposed on one side thereof. The cooking unit 200 includes the cooking unit body 210 open on one side thereof and having a given space formed at the inside thereof, a cooking unit cover 211 detachably disposed on the open portion of the cooking unit body 210, and the heating part 220 disposed under the portion where the tempered glass or the heat resistant glass of the cooking unit body 210 is located to apply heat to the cooking container through electromagnetic induction heating and thus to cook the food in the cooking container.

The heating part 220 includes a support plate 221, coils 230, and ferrite cores 240.

The support plate 221 has a shape of a general circle and includes support pieces 222 formed radially thereon, fixing pieces 223 spaced apart from each other on each support piece 222, and coupling grooves 224 formed on the undersides of the fixing pieces 223 to couple the ferrite cores 240 thereto.

Further, the support plate 221 has a plurality of coil fixing holes 225 formed along one side periphery thereof in such a manner as to connect the ends of the coils 230 to a heating part controller 340 and a plurality of fixing protrusions 226 protruding outwardly therefrom and having screw holes, so that the support plate 221 can be fixed to the cooking unit body 210.

The support plate 221 has a plurality of fitting holes 227 formed thereon to fit the coils 230 disposed spirally thereto.

The coils 230 are located on top of the support plate 221 at a given distance to cook the food through the electromagnetic induction heating. The coils 230 are electrically connected to the heating part controller 340 and receive power to cook the food or ramen in the cooking container through the electromagnetic induction heating.

Further, the coils 230 have a plurality of fixing plates 231 each having a plurality of fixing protrusions formed thereon in such a manner as to be fixed to top of the support plate 221. The fixing plates 231 are coupled to the plurality of fitting holes 227 formed on the support plate 221 to fix the coils 230 to the support plate 221.

The ferrite cores 240 are fixed to the coupling grooves 224 formed on the support pieces 222 of the circular support plate 221.

Figure 5:
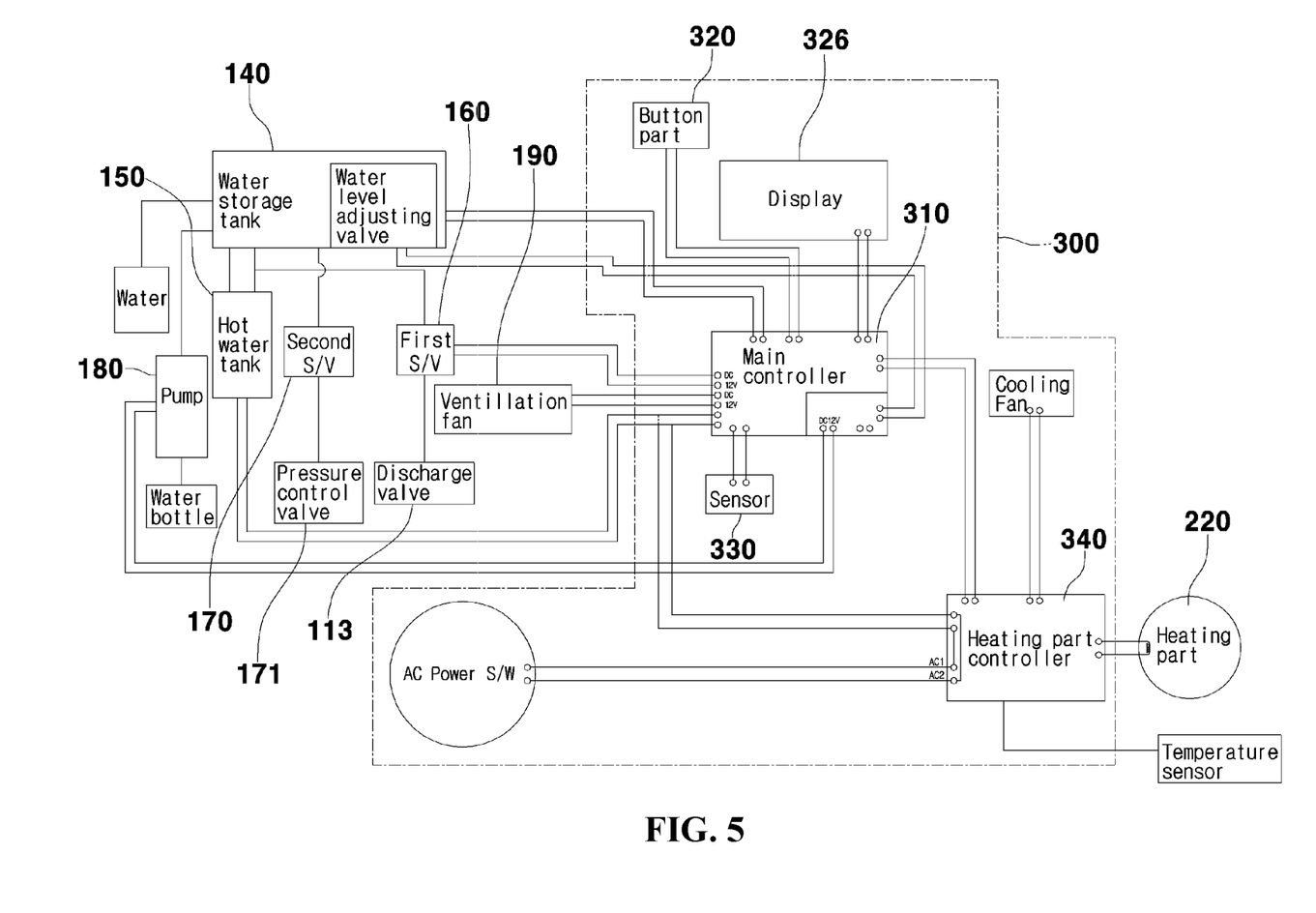
FIG. 5 is a block diagram showing a control unit of the multi-functional food cooker having water purification function according to the present invention.

The control unit 300 includes the main controller 310 for performing cooking container existence/nonexistence checking, the control of the first solenoid valve 160 or the second solenoid valve 170 adapted to supply purified water or hot water, and the control of the heater 153 so as to cook the food if a button part 320 disposed on the front surface of the food cooker's body 110 is manipulated by the user, the button part 320 disposed on the front surface of the food cooker's body 110 to allow the food or ramen cooking, water adding, or time adding to be selectively carried out through the user, and the heating part controller 340 electrically connected to the main controller 310 to control the heating part 220 for food cooking.

The main controller 310 includes a memory (not shown) in which a program is stored to cook the food or ramen if the button part 320 disposed on the front surface of the food cooker's body 110 is manipulated by the user, a microcomputer (not shown) for reading out the program stored in the memory to control the cooking for the food or ramen according to the manipulation of the button part 320, and a power part (not shown) for supplying power needed for the microcomputer, the heater 153, the pump 180, the heating part 220, the button part 320, and a sensor 330.

The main controller 310 has the sensor 330 disposed on the front surface of the food cooker's body 110 to check whether the cooking container is located on the heating part 220.

The button part 320 is disposed on the upper side of the front surface of the food cooker's body 110 so as to allow general food cooking or ramen cooking to be selected, so that in the state where the cooking container is not located on the cooking unit body 210, the button part 320 are not activated, but only when the cooking container is located thereon, the button part 320 is activated.

The button part 320 includes a cooking button 321 for selecting the food cooking or ramen cooking, a start/stop button 322 for starting the food cooking or ramen cooking in the state where the cooking button 321 is selected, a hot water button 323 for adding water when additional water is needed during the general food cooking or the ramen cooking, a purified water button 327 for adding purified water, not hot water, and a time adding button 325 for setting given time for the cooking by the user or for adding time required for the cooking.

The cooking button 321 includes an instant cooking button 321-2 for cooking convenient food sold at convenience stores, large-scale discount stores, supermarkets, and so on and a general cooking button 321-1 for cooking ramen. As the cooking button 321 is divided into the instant cooking button 321-2 and the general cooking button 321-1, cooking time and amount of water are adjusted and supplied according to the buttons.

Further, the button part 320 includes a display 326 adapted to display cooking time.

General cooking is selected by the cooking button 321 of the button part 320, and after cooking time is set and the amount of water is adjusted, the start/stop button 322 is pressed to start cooking. At this time, the whole time is displayed on the display 326, and then, the time on the display 326 is counted.

After only the amount of water is adjusted, without any adjustment in the cooking time, if the start/stop button 322 is pressed, the cooking time is counted, while the cooking is starting.

If the cooking starts to allow a cooking temperature to reach 200° C., power supply is automatically blocked by the control unit 300, so that the cooking temperature is not raised anymore.

Ramen cooking is selected by the general cooking button 321-2 of the cooking button 321, and if the start/stop button 322 is pressed, 400 ml of water is supplied through the discharge valve 113 according to the program stored in the memory of the control unit 300, and 3 minutes and 30 seconds are automatically set. At this time, the time on the display 326 is counted, and at the same time, power is applied to the heating part 220 to start the ramen cooking through the electromagnetic induction heating.

If water or time is additionally selected by the user, 50 ml of water and 30 seconds are added.

The heating part controller 340 is adapted to apply power to the coils 230 or to block the power application to the coils 230 through signals applied from the main controller 310.

Further, the heat generated from the heating part controller 340 is discharged to the outside of the cooking unit body 210 through a heat sink and a fan, thereby preventing the occurrence of malfunctions caused by the heat.

Even if not explained in the above-mentioned configuration, a shape of a fire pot is provided to the tempered glass or heat resistant glass disposed on top of the cooking unit body 210 by means of powder coating so as to generate heat from cooking containers not heated by the electromagnetic induction heating, like general glass containers.

If the shape of the fire pot is coated with a metal material by means of the powder coating, the electromagnetic induction heat is generated from the coils 230 and the ferrite cores 240, so that food or ramen can be cooked, without using any container made of a metal material containing iron.

A power switch 112 and a fuse (not shown), which are not explained in the drawing, are located on one side of the cooking unit cover 211. The power switch 112 is located on the heating part controller 340 formed of a PCB to supply normal power or to block the supply of the normal power, and the fuse is located on the heating part controller 340 formed of the PCB to block the supply of the normal power when an overcurrent is generated, thereby protecting the food cooker from the overcurrent.

Under the above-mentioned configuration, now, an explanation on the food cooking procedure using the multi-functional food cooker according to the present invention will be given with reference to FIGS. 5 and 6.

Figure 6:
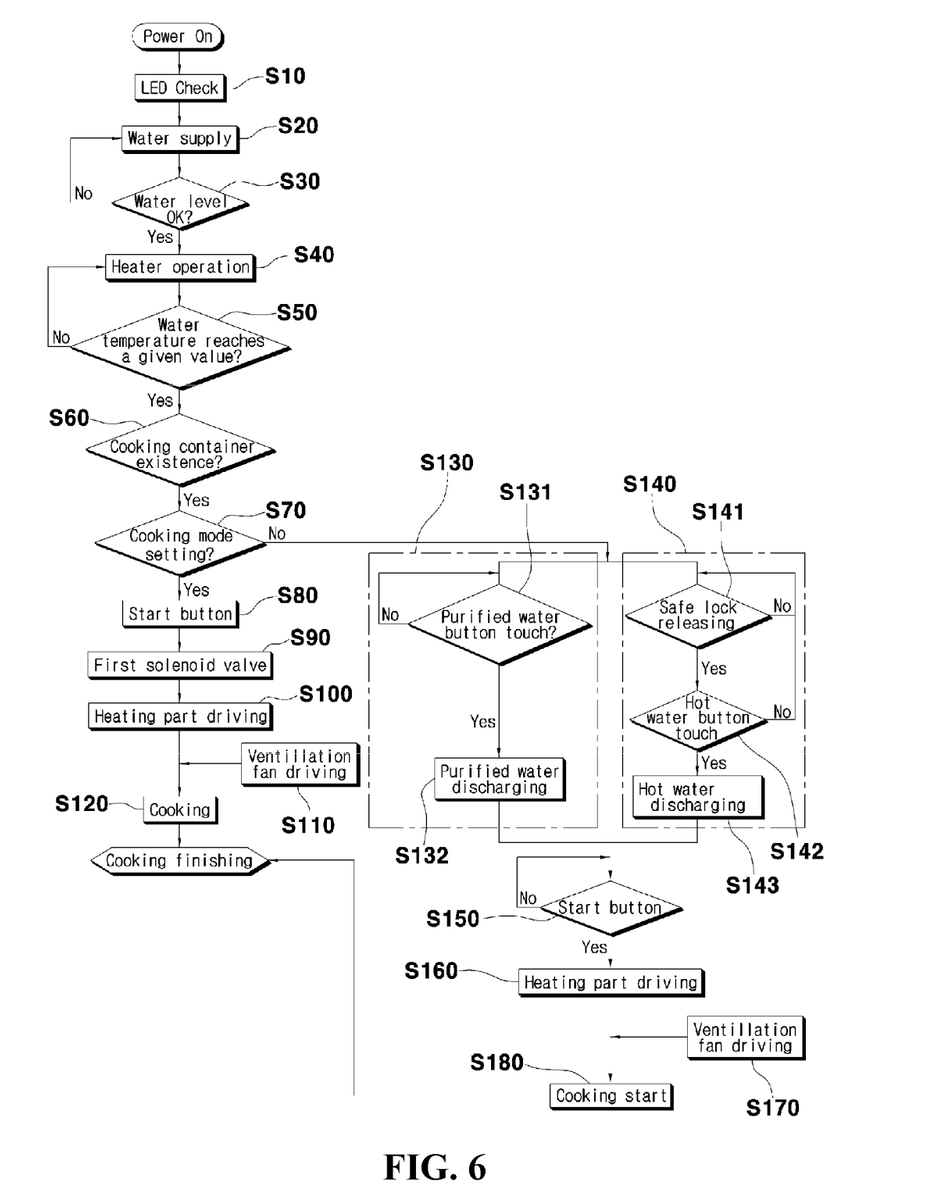
FIG. 6 is a flowchart showing a food cooking procedure using the multi-functional food cooker having water purification function according to the present invention.

FIG. 5 is a block diagram showing a control unit of the multi-functional food cooker having water purification function according to the present invention, and FIG. 6 is a flowchart showing a food cooking procedure using the multi-functional food cooker having water purification function according to the present invention.

Now, a process for installing the multi-functional food cooker having water purification function according to the present invention and a process for cooking food (instant food or general food) will be explained.

In the state where the multi-functional food cooker according to the present invention is located at a given place in a store, first, it is connected to the tap or water bottle so as to receive the water supplied therefrom.

The power switch 112 located on the rear surface of the multi-functional food cooker according to the present invention is turned on to apply power to the main controller 310 of the control unit 300.

If the power is applied to the main controller 310 of the control unit 300, the cooking button 321, the instant cooking button 321-2, the general cooking button 321-1, the start/stop button 322, the hot water button 323, the time adding button 325, and the purified water button 327 of the button part 320 are all lightened for 3 seconds at step S10.

After the buttons of the button part 320 are lightened, the purified water through the filters 120 is supplied to the water tank 141 of the water storage tank 140 through the pump 180, and the water supplied to the water tank 141 is supplied to the hot water tank 150 at step S20.

The water supplied to the water tank 141 is introduced into the hot water tank 150, and next, it is determined whether the purified water introduced into the hot water tank 150 reaches a maximum level at step S30. If it is determined that the purified water does not reach the maximum level, water supply is kept.

If it is determined that the purified water supplied to the hot water tank 150 reaches the maximum level, the operation of the pump 180 stops to block water supply, and at the same time, the electrical signal is applied from the main controller 310 to the heater 153, thereby heating the water in the hot water tank 150 at step S40.

Next, it is determined by the main controller 310 whether the temperature of water of the hot water tank 150 heated by the heater 153 is 85° C. or more, and if it is determined that the temperature of water of the hot water tank 150 is 85° C. or under, heating is kept. However, if it is determined that temperature of water of the hot water tank 150 is 85° C. or more, heating stops.

In the state where the water is supplied to the multi-functional food cooker according to the present invention at step S50, the convenient food is purchased by the user and is put in a disposable container (aluminum container or the like) or metal cooking container. Next, the cooking container in which the convenient food is put is located on top of the cooking unit body 210 of the cooking unit 200, and it is determined by the main controller 310 whether the cooking container is located on the cooking unit body 210. If it is determined that the cooking container is not located on the cooking unit body 210, it is checked whether the cooking container is located thereon at intervals of given time periods.

If it is determined by the main controller 310 that the cooking container is located on the cooking unit body 210, it is determined by the main controller 310 whether a cooking mode is set by the user's manipulation through the button part 320 at step S70.

If the cooking container is located on the cooking unit body 210, safe lock is released by the main controller 310 to allow the button part 320 to be manipulated by the user at the step S70.

If the cooking button 321 and the start/stop button 322 are sequentially pressed by the user, the first solenoid valve 160 is driven by the previously stored program of the main controller 310 according to the cooking mode set by the user, so that the hot water in the hot water tank 150 can be supplied to the cooking container through the discharge valve 113 at step S80.

The hot water is supplied to the cooking container through the discharge valve 113, and at the same time, power is applied to the heating part 220 disposed on the cooking unit body 210 under the control of the main controller 310, thereby carrying out the food cooking by means of the electromagnetic induction heating at step S90.

Further, the power is supplied to the heating part 220, so that the food cooking is carried out at step S100, and at the same time, the ventilation fan 190 disposed inside the food cooker's body 110 is driven to prevent the water vapor generated during the food cooking from being introduced into the discharge valve 113 at step S110.

In the state where the purified water supply, heating, and blowing are carried out, instant cooking for the food put inside the cooking container is carried out for a given period of time by the previously stored program of the main controller 310 at step S120.

Hereinafter, an explanation on the general cooking process will be given. The general cooking is divided into a method for cooking food through the discharge of purified water and a method for cooking food through the discharge of hot water.

First, the method for cooking food through the discharge of purified water will be explained.

In the state where the cooking mode is not set by the user at the step S70, if the cooking container is put on the cooking unit body 210, the cooking container put on the cooking unit body 210 is recognized by the sensor 330, and the signal generated by recognizing the cooking container is applied from the sensor 330 to the main controller 310 at step S60.

The safe lock is released by the main controller 310 to allow the button part 320 to be activated by the user, and in this state, it is determined by the main controller 310 whether the button part 320 for discharging the purified water is touched at step S130.

It is determined by the main controller 310 whether the purified water button 327 of the button part 320 is pressed by the user at the step S130, and if it is determined that the purified water button 327 is pressed, the purified water is discharged to the discharge valve 113 through the second solenoid valve 170 at step S132.

In the state where the discharge of the purified water to the discharge valve 113 is completed, it is determined by the main controller 310 whether the start/stop button 322 is touched by the user, and if it is determined that the start/stop button 322 is not touched, it is checked by the main controller 310 whether the start/stop button 322 is touched by the user.

In the state where the discharge of the purified water is completed, if it is determined by the main controller 310 that the start/stop button 322 is touched by the user, an electrical signal is applied from the main controller 310 to the heating part controller 340 to allow the food in the cooking container to be cooked.

If the electrical signal is applied to allow the heating part 220 disposed on the cooking unit body 210 to be driven at step S160, an electric current is applied to the coils 230 of the heating part 220 to carry out the food cooking through the electromagnetic induction heating.

The main controller 310 enables the food to be cooked through the heating part 220 and at the same time applies electric current to the ventilation fan 190 disposed in the food cooker's body 110 to prevent the discharge valve 113 from being contaminated with the water vapor generated while the food in the cooking container is being cooked.

In the state where the electrical signal is applied to the heating part 220 and the ventilation fan 190 from the main controller 310, the food in the cooking container starts to be cooked at step S180.

Now, the method for cooking food through the discharge of hot water will be explained.

If the cooking container is put on the cooking unit body 210, the cooking container put on the cooking unit body 210 is recognized by the sensor 330, and the signal generated by recognizing the cooking container is applied from the sensor 330 to the main controller 310 at the step S60.

The safe lock is released by the main controller 310 to allow the button part 320 to be activated by the user to discharge hot water at step S140.

At the step S140, the safe lock is released by the main controller 310 to discharge hot water in the state where the cooking container is recognized, thereby activating the button part 320 at step S141.

In the state where the button part 320 is activated, it is determined by the main controller 310 whether the hot water button 323 is touched at step S142.

If it is determined by the main controller 310 that the hot water button 323 is pressed by the user, the main controller 310 applies a signal to the first solenoid valve 160 to discharge the hot water stored in the hot water tank 150 through the discharge valve 113 at step S143.

In the state where the discharge of the hot water to the discharge valve 113 is completed, it is determined by the main controller 310 whether the start/stop button 322 is touched by the user, and if it is determined that the start/stop button 322 is not touched, it is checked by the main controller 310 whether the start/stop button 322 is touched by the user.

In the state where the discharge of the hot water is completed, if it is determined by the main controller 310 that the start/stop button 322 is touched by the user, an electrical signal is applied from the main controller 310 to the heating part controller 340 to allow the food in the cooking container to be cooked.

If the electrical signal is applied to allow the heating part 220 disposed on the cooking unit body 210 to be driven at the step S160, an electric current is applied to the coils 230 of the heating part 220 to carry out the food cooking through the electromagnetic induction heating.

The main controller 310 enables the food to be cooked through the heating part 220 and at the same time applies current to the ventilation fan 190 disposed in the food cooker's body 110 to prevent the discharge valve 113 from being contaminated with the water vapor generated while the food in the cooking container is being cooked.

In the state where the electrical signal is applied to the heating part 220 and the ventilation fan 190 from the main controller 310, the food in the cooking container starts to be cooked at the step S180.

As described above, the multi-functional food cooker having water purification function according to the present invention is configured to have the program stored therein to allow the instant cooking and the ramen cooking to be selected by the user, so that the amount of water to be poured and the heating time are adjusted by the simple button manipulations of the user, thereby easily cooking the instant food or ramen.

According to the present invention, further, the button part is not manipulated since it is in a deactivated state in the state where the cooking container is not placed on the cooking unit body, and only in the state where the cooking container is placed on the cooking unit body, the button part is activated and manipulated, thereby permitting the food cooker to be safely used.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A multi-functional food cooker having a water purification function, comprising:
   a water supply unit for feeding water supplied from a tap or water bottle as hot water or purified water according to a user's selection to allow food to be cooked with the hot water or purified water;
   a cooking unit adapted to cook the food with the hot water or purified water fed to a cooking container and located on an underside of the water supply unit to prevent the user from being burned due to residual heat after food cooking; and
   a control unit including a sensor, disposed on the water supply unit and the cooking unit to control a water supply, a heating time and a temperature for cooking the food in the cooking container,
   wherein the water supply unit comprises:
   a food cooker's body having a given space formed inside thereof in such a manner as to be open on a side thereof and having a discharge valve disposed on a front surface thereof to supply the hot water or the purified water;
   a body cover detachably mounted on the open side of the food cooker's body and having a plurality of nipples adapted to couple hoses thereto so as to connect the hoses to the tap or the water bottle;
   a plurality of filters disposed on one side of the body cover by a filter clip to purify the water;
   a distributor connected to the plurality of filters to dividedly supply the water supplied through the plurality of filters to the discharge valve;
   a water storage tank located inside the food cooker's body to store the water supplied from the plurality of filters through the distributor;
   a hot water tank located under the water storage tank to store the water supplied from the water storage tank and having a heater adapted to heat the water stored therein;
   a first solenoid valve adapted to supply the hot water supplied from the hot water tank to the discharge valve to cook the food; and
   a second solenoid valve disposed inside the food cooker's body and between the discharge valve and the distributor to supply the water from the plurality of filters and the distributor to the discharge valve and having a pressure control valve mounted thereon,
   the cooking unit comprises:
   a cooking unit body having a shape of a flat plate to locate the food cooker's body on top thereof, having tempered glass or heat resistant glass disposed on one side thereof to place the cooking container thereon, having a space formed inside thereof, and being open on a side thereof;
a cooking unit cover detachably disposed on the open side of the cooking unit body; and
a heating part disposed inside the cooking unit body and comprising a circular support plate disposed under the cooking unit body and having support pieces, fixing pieces, coupling grooves; and coil fixing holes and fitting holes; coils fixed on top of the support plate by fixing palates to cook the food in the cooking container through electromagnetic induction heating; fixing plates located on tops of the coils and having fixing protrusions to be coupled to the fitting holes of the support plate and ferrite cores insertedly disposed on an underside of the support plate.

2. The multi-functional food cooker according to claim 1, wherein the filter clip comprises:
a flat panel fixed to one side of the body cover by bolts; and
a plurality of Ω-shaped clip members disposed on one side of the flat panel to fix the plurality of filters thereto.

3. The multi-functional food cooker according to claim 1, wherein the water supply unit supplies the water supplied from the tap or from the water bottle by a pump to the water storage tank through the plurality of filters and the distributor, stores the water in the water storage tank, heats the water in the hot water tank, and selectively supplies the hot water fed from the hot water tank to the cooking container through the first solenoid valve and the discharge valve and the water purified through the plurality of filters and the distributor and reduced in pressure through the second solenoid valve and the pressure control valve to the discharge valve.

4. The multi-functional food cooker according to claim 1, wherein the food cooker's body comprises a ventilation fan adapted to prevent a water vapor generated from the food during cooking from being introduced into the discharge valve, the ventilation fan being electrically connected to a main controller of the control unit so that blowing occurs toward the front surface of the food cooker's body only when power is applied to the heating part.

5. The multi-functional food cooker according to claim 1, wherein the control unit comprises:
a main controller for carrying out cooking container existence/nonexistence checking, a control of the first solenoid valve or the second solenoid valve adapted to supply the purified water or the hot water, and a control of the heater so as to cook the food if a button part disposed on the front surface of the food cooker's body is manipulated by the user;
the button part disposed on the front surface of the food cooker's body and having a cooking button, an instant cooking button, a general cooking button, a start/stop button, a hot water button, a purified water button, a time adding button, and a display;
the sensor disposed on the front surface of the food cooker's body and electrically connected to the main controller to check whether the cooking container is located on the heating part and thus to allow the button part to be activated or deactivated; and
a heating part controller electrically connected to the main controller to control the heating part for food cooking,
wherein the main controller is formed of a printed circuit board (PCB) located inside the food cooker's body and the heating part controller is formed of a PCB located inside the cooking unit body.

\* \* \* \* \*